US008401230B2

(12) United States Patent
Kozitsky et al.

(10) Patent No.: US 8,401,230 B2
(45) Date of Patent: Mar. 19, 2013

(54) SIGNATURE BASED DRIVE-THROUGH ORDER TRACKING SYSTEM AND METHOD

(75) Inventors: Vladimir Kozitsky, Rochester, NY (US); Aaron Micheal Burry, Ontario, NY (US); Zhigang Fan, Webster, NY (US); Frank Bradley Mayberry, Vienna, VA (US); John Deppen, North Potomac, MD (US)

(73) Assignee: Xerox Corporation, Norwalk, CT (US)

( * ) Notice: Subject to any disclaimer, the term of this patent is extended or adjusted under 35 U.S.C. 154(b) by 285 days.

(21) Appl. No.: 12/916,749

(22) Filed: Nov. 1, 2010

(65) Prior Publication Data

US 2012/0106781 A1     May 3, 2012

(51) Int. Cl.
*G06K 9/00*     (2006.01)
(52) U.S. Cl. ........................................ 382/103; 382/104
(58) Field of Classification Search .................. None
See application file for complete search history.

(56) References Cited

U.S. PATENT DOCUMENTS

| | | | |
|---|---|---|---|
| 4,817,166 A * | 3/1989 | Gonzalez et al. | 382/105 |
| 4,878,248 A * | 10/1989 | Shyu et al. | 382/105 |
| 5,081,685 A * | 1/1992 | Jones et al. | 382/105 |
| 6,553,131 B1 | 4/2003 | Neubauer et al. | |
| 6,980,698 B2 | 12/2005 | Eschbach et al. | |
| 6,982,654 B2 | 1/2006 | Rau et al. | |
| 2002/0111881 A1 * | 8/2002 | Walker et al. | 705/26 |
| 2002/0178073 A1 * | 11/2002 | Gravelle | 705/26 |
| 2003/0195821 A1 * | 10/2003 | Kennamer | 705/26 |
| 2008/0031522 A1 | 2/2008 | Axemo et al. | |
| 2010/0054539 A1 | 3/2010 | Challa | |

OTHER PUBLICATIONS

Anagnostopoulos, C.-N. E., et al., "License Plate Recognition From Still Images and Video Sequences: A Survey,"*IEEE Transactions on Intelligent Transportation Systems* (2008) 9(3):377-391.
Lowe, D. G., "Object Recognition from Locale Scale-Invariant Features,"*Proc. of the International Conference on Computer Vision* (1999) Sept., Corfu, pp. 1-8.

* cited by examiner

*Primary Examiner* — Andrew W Johns
*Assistant Examiner* — Siamak Harandi
(74) *Attorney, Agent, or Firm* — Luis M. Ortiz; Kermit D. Lopez; William B. Shelby

(57) ABSTRACT

A system and method for providing signature-based drive-through order tracking. An image with respect to a vehicle at a POS unit can be captured at an order point and a delivery point (e.g., a payment point and a pick-up point) utilizing an image capturing unit by detecting the presence of the vehicle at each point utilizing a vehicle presence sensor. The captured image can be processed in order to extract a small region of interest and can be reduced to a unique signature. The extracted signature of the vehicle at the order point can be stored into a database together with the corresponding order and the vehicle image. The signature extracted at the delivery point can be matched with the signature stored in the database. If a match is found, the order associated with the vehicle together with the images captured at the delivery point and the order point can be displayed in a user interface at the delivery point to ensure that the right order is delivered to a customer.

20 Claims, 6 Drawing Sheets

SIGNATURE BASED DRIVE-THROUGH ORDER TRACKING SYSTEM AND METHOD

TECHNICAL FIELD

Embodiments are generally related to drive-through order management systems and methods. Embodiments are also related to sensing devices and techniques. Embodiments are additionally related to signature-based order tracking in a drive-through service environment.

BACKGROUND OF THE INVENTION

A "drive-through" is a type of service provided by a business such as, for example, fast-food restaurant, bank, pharmacy, and coffee shop that permits a customer to purchase a product without leaving their vehicle. Such drive-through services provides the customer with fast and convenient service while increasing the number of customers that may be served through conventional walk-in transactions. Orders can be generally placed utilizing a microphone and picked up in person at the window. As the order is being placed, an order-taker enters the order information into an order management system. The order information can be displayed on a display such that the order can be assembled by a runner.

Conventionally, ordering paradigms utilize a single-queue approach that makes the customers with small, quick orders wait behind the customers with large complex orders. The problem associated with such approach is that the vehicles can get out of order between the time the order is placed and the vehicle receives the product. Additionally, such prior art approaches does not ensure that the correct product is being delivered to the vehicle that placed the order which further reduces order accuracy and efficiency. Such problems are exacerbated in highly trafficked locations where multiple lanes of order placement exist for each order processing window which result in decreased customer satisfaction and significant loss of revenues.

Based on the foregoing, it is believed that a need exists for an improved system and method for providing signature based drive-through order tracking, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved drive-through order management system and method.

It is another aspect of the disclosed embodiments to provide for an improved method and system for providing signature-based drive-through order tracking.

It is a further aspect of the disclosed embodiments to provide for an improved method for extracting a signature of a vehicle by analyzing a region of interest.

The aforementioned aspects and other objectives and advantages can now be achieved as described herein. A system and method for providing signature-based drive-through order tracking, is disclosed herein. An image with respect to a vehicle at a POS (Point Of Sale) unit can be captured at an order point and a delivery point (e.g., payment point and pick-up point) utilizing an image capturing unit by detecting the presence of the vehicle at each point utilizing a vehicle presence sensor. The captured image can be processed in order to extract a small region of interest (e.g., license plate) and can be reduced to a unique signature. The extracted signature of the vehicle at the order point can be stored into a database together with the corresponding order and the vehicle image. The signature extracted at the delivery point can be matched with the signature stored into the database. If a match is found, the order associated with the vehicle together with the images captured at the delivery point and the order point can be displayed in a user interface at the delivery point to ensure that the right order is delivered to a customer.

In an extraction mode, the region of interest can be located and the signature of the vehicle at the order point can be extracted and stored in the database. The ROI (region of interest) with respect to the vehicle image can be extracted utilizing an automated license plate recognition technique (e.g., a mathematical morphological based recognition technique) in order to determine the signature. The signature can be, for example, a license plate number obtained via an optical character recognition technique, a bitmap of the ROI, and/or other images features (e.g. Scale-invariant feature transform (SIFT) features). The signature can then be stored in the database together with the associated order and the vehicle image.

In a matching mode the signature of the vehicle at the payment point and the pick-up point can be extracted and matched with the signatures stored in the database. If the signature is the license plate number, the matching can be performed by a simple character comparison. If the signature is the bitmap, a 2-D correlation type matching can be exploited. A matching of SIFT features can be accomplished by the matching features based on Euclidean distance of the feature vectors. The order associated with the current vehicle can be displayed in the user interface, together with the images captured at the delivery point and the order point. The signature can be automatically deleted along with the image and the order from the database after dispatching the order to the customer. Such an approach can be effectively utilized in a wide range of drive through service environments in order to ensure respective orders have been assembled and are ready to be presented or delivered to the customer.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
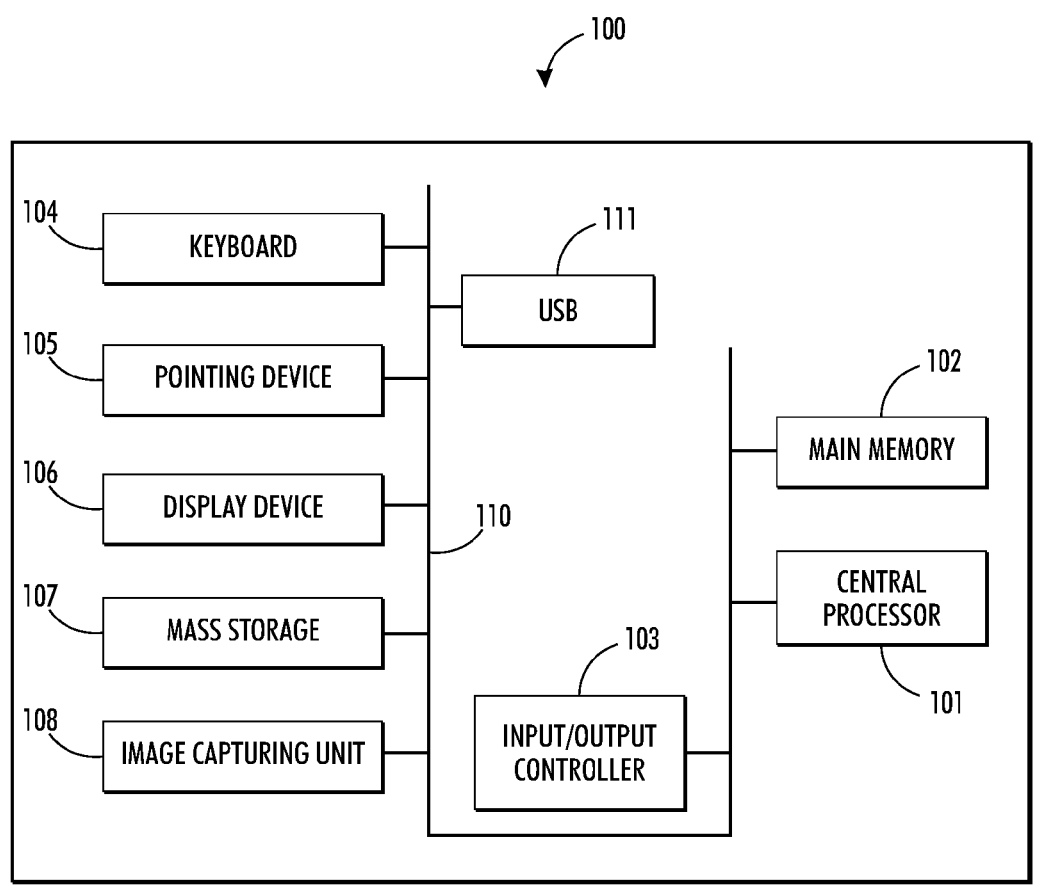
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product. Accordingly, the present invention may take the form of an entire hardware embodiment, an entire software embodiment, or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment such as, for example, VisualBasic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures, according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
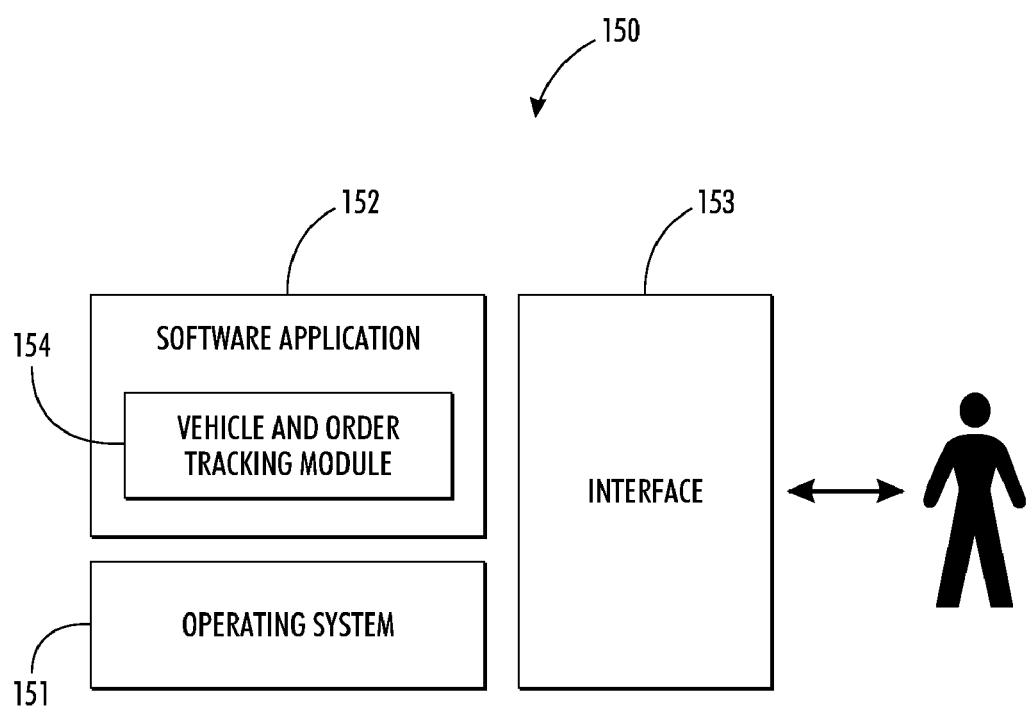
FIG. 2 illustrates a schematic view of a software system including a vehicle and order tracking module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, and pen device, etc.), a display device 106, a mass storage 107 (e.g., a hard disk), and a USB (Universal Serial Bus) peripheral connection 111. Additional input/output devices, such as an image capturing unit 108 (e.g., camera, etc.), for example, may be associated with the data-processing system 100 as desired. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 152, stored in main memory 102 and on mass storage 107, generally includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), can serve to display results, whereupon a user may supply additional input or terminate a particular session. In some embodiments, operating system 151 and interface 153 can be implemented in the context of a "Windows" system. It can be appreciated, of course, that other types of systems are possible. For example, rather than a traditional "Windows" system, other operation systems such as, for example, a Real Time Operating System (RTOS) more commonly employed in wireless systems may also be employed with respect to operating system 151 and interface 153. The software application 152 can include, for example, an order tracking module 154 for managing an order based on a signature with respect to a vehicle. The vehicle and order tracking module 154 can include instructions such as those of method 500 discussed herein with respect to FIG. 6.

FIGS. 1-2 are thus intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms including Macintosh, UNIX, LINUX, and the like.

Figure 3:
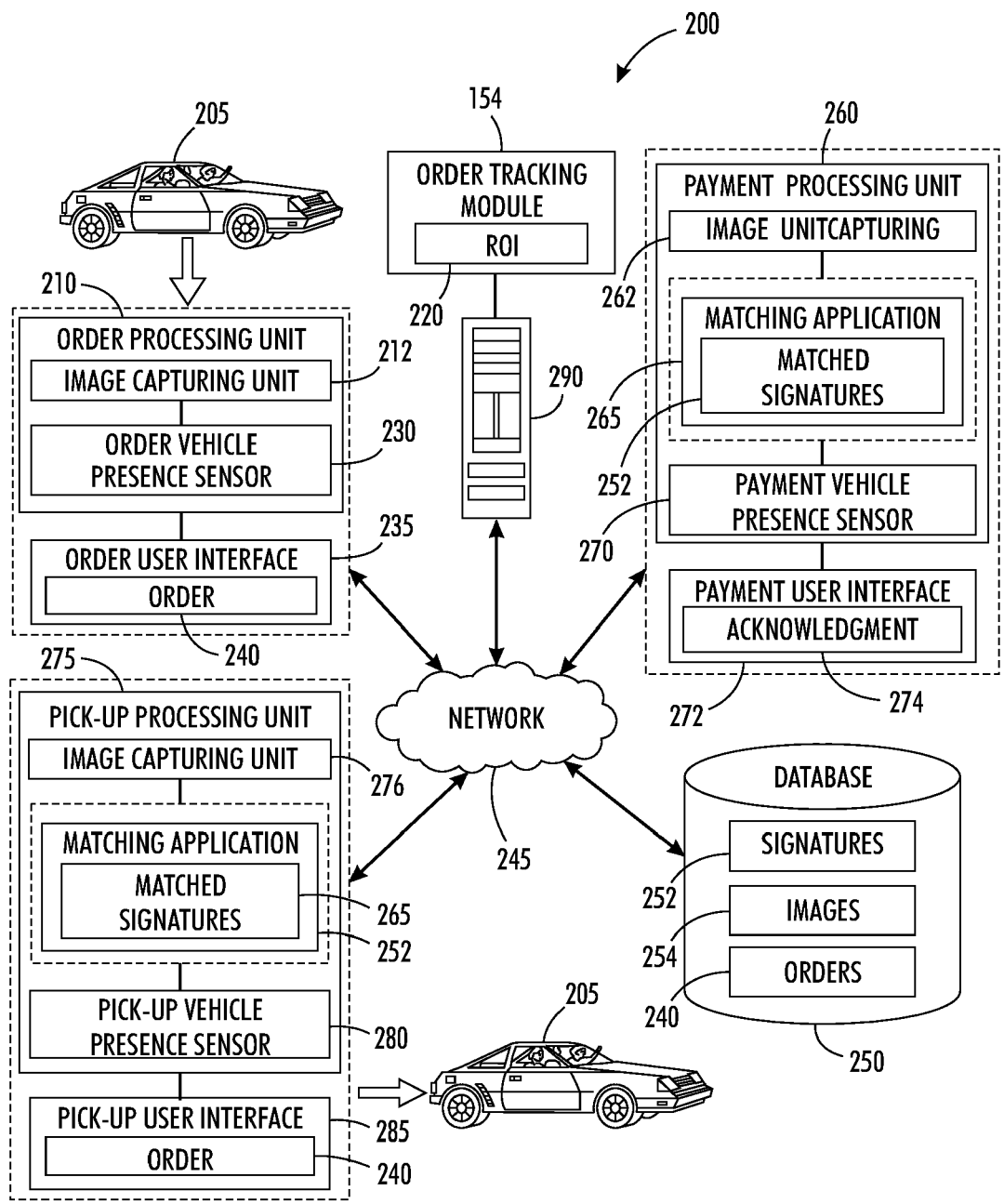
FIG. 3 illustrates a block diagram of a signature based order tracking system, in accordance with the disclosed embodiments.

FIG. 3 illustrates a block diagram of a point of sale (POS) system for tracking an order 240 with respect to a vehicle 205, in accordance with the disclosed embodiments. Note that in FIGS. 1-6, identical or similar blocks are generally indicated by identical reference numerals. The POS system 200 can be effectively employed in a wide range of drive-through service environments in order to ensure delivery value and superior service with respect to a mobile and time-starved customer. The system 200 generally includes an order processing unit 210, one or more delivery points such as a payment processing unit 260 and a pick-up processing unit 275, and a centralized tracking server 290 having the order tracking module 154 that are operatively configured in association with the network 245.

Note that the network 245 can be an Internet connection representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network 245 also may be implemented as a number of different types of networks.

The order processing unit 210 of the POS system 200 captures an image 254 with respect to the vehicle 205 utilizing an order-point image capturing unit 212 by detecting the presence of the vehicle 205 utilizing an order-point vehicle presence sensor 230. The order processing unit 210 further includes an order-point user interface 235 in order to provide the order 240 with respect to the customer. Similarly, the payment processing unit 260 and the pick-up processing unit 275 of the POS system 200 includes separate image processing units such as a payment-point image capturing unit 262 and a pick-up point image capturing unit 276 for capturing the images 254 with respect to the vehicle 205 by detecting the presence of the vehicle 205 via the vehicle presence sensors 270 and 280, respectively.

Note that the image capturing units 212, 262 described in greater detail herein are analogous or similar to the image capturing unit 108 of the data-processing system 100, depicted in FIG. 1. The image capturing unit may include built-in integrated functions such as image processing, data formatting, and data compression functions. Also, the unit includes imager-positioning, range-finding, and a flash bulb.

The order tracking module 154 of the centralized server 290 processes the captured images 254 in the POS system 200 in order to extract a small region of interest (ROI) 220 such as, for example, a license plate. A Region of Interest, often abbreviated ROI, is a selected subset of samples within a dataset identified for a particular purpose. The region of interest 220 with respect to the vehicle 205 can be further reduced to a unique signature 252 at the order processing unit 210 and stored into a database 250 together with the corresponding order 240 and the vehicle image 254. A matching application 265 configured at the payment processing unit 260 and the pick-up processing unit 275 further matches the signatures 252 extracted at the payment processing unit 260 and the pick-up processing unit 275 with the signature 252 stored into the database 250.

The matching application 265 further displays the order 240 associated with the vehicle 205 together with the images 254 captured at the delivery points 260 and 275 and the order processing unit 210 into the user interfaces 272 and 285 to ensure the right order 240 is delivered to the customer. The payment-point user interface 272 provides a payment acknowledgment with respect to the order 240 placed at the order processing unit 210 of the POS system 200. Similarly, the pick-up point user interface 285 displays the delivered orders 240 with respect to the vehicle 205.

Figure 4:
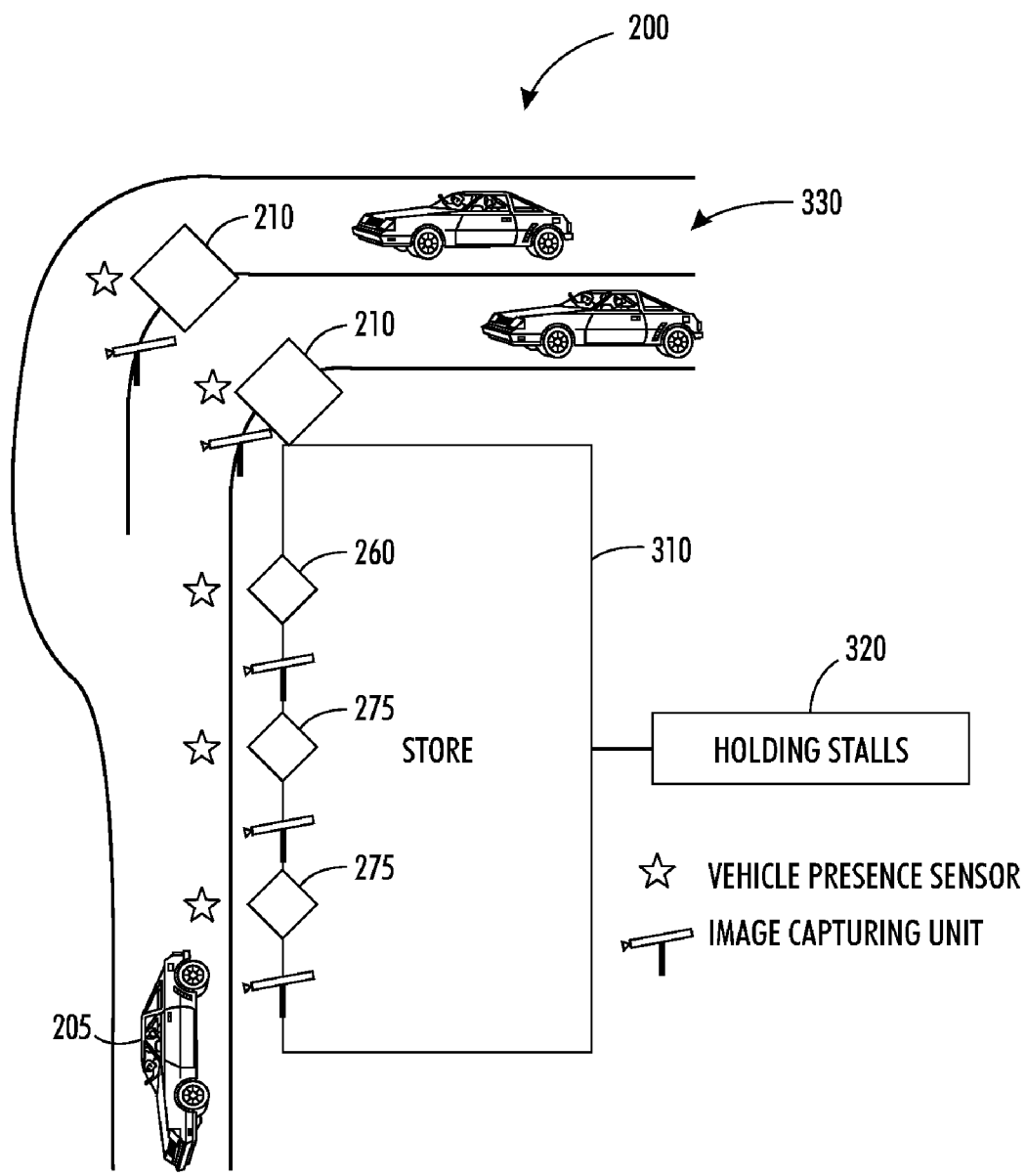
FIG. 4 illustrates a perspective view of the signature based order tracking system in a drive through service environment, in accordance with the disclosed embodiments.

FIG. 4 illustrates a perspective of the point of sale (POS) system 200 within a drive-through service environment 320. The system 200 can be configured with a store 310 having a holding stall 320 in order to process and mange the orders 240 within the store 310. The holding stalls 320 can hold the pending orders 240 within the POS system 200. The system 200 can be enabled in an extraction mode in order to extract and store the signatures 252 and can be also made available in a matching mode in order to match the signatures 252 of the vehicle 205. In the extraction mode, the region of interest 220 can be located with respect to the image 254 of the vehicle 205 and the signature 252 of the vehicle 205 can be extracted and stored in the database 250. Note that the region of interest (ROI) 220 is a portion of the image 240 that a user can filter or perform some other operation. It is sometimes of interest to process a single sub-region of the image 240 by leaving other regions unchanged. The region of interest 220 with respect to the vehicle image 254 can be extracted utilizing an automated license plate recognition technique such as, for example a mathematical morphological based recognition technique in order to determine the signature 252. The signature 252 can be, for example, a license plate number obtained via an optical character recognition technique, a bitmap of the region of interest 220, or other image features, for example, Scale-invariant feature transform.

In the matching mode, the signatures 252 of the vehicle 205 at the payment processing unit 260 and the pick-up processing unit 275 can be extracted and matched with the signatures 252 stored in the database 250. If the signature 252 is the license plate number, the matching can be performed by a simple character comparison. If the signature is the bitmap, a 2-D correlation type matching can be exploited. A matching of SIFT features can be accomplished by the matching features based on Euclidean distance of the feature vectors. The signatures 252 with respect to the vehicle 205 can also be extracted by utilizing a wide range of other recognition approaches such as support vector machine methods, pattern classification, Bayesian decision methods, neural network classifies, fuzzy logic decision making, and genetic algorithm based optimizers, etc. Such signatures 252 can be further employed to effectively assemble the orders 240 with respect to the customer in the drive through environment 330. The signature 252 can be stored in the database 250 together with the associated order 240 and the vehicle image 254. The signatures 252 can be automatically deleted along with the image 254 and order 240 from the database 250 after dispatching the order 240 to the customer.

Figure 5:
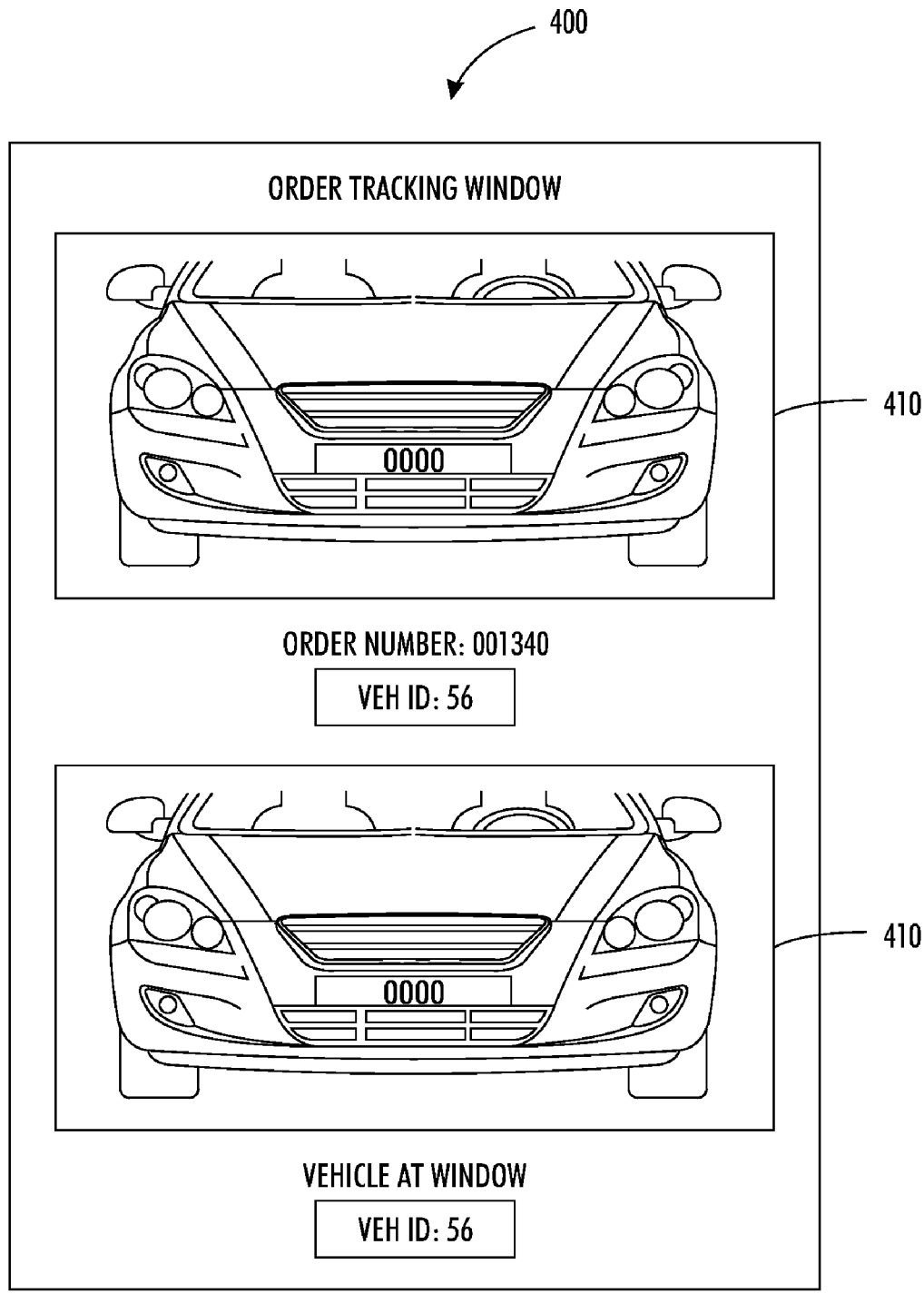
FIG. 5 illustrates a graphical representation of an order tracking window, in accordance with the disclosed embodiments.

FIG. 5 illustrates a graphical representation of an order tracking window 400 with respect to the delivery points 260 and 275 of the POS system 200, in accordance with the disclosed embodiments. The graphical window 400 is generally implemented in the context of a GUI "window". Note that in computing, a GUI "window" is generally a visual area containing some type of user interface. Such a "window" usually (but not always) possesses a rectangular shape and displays the output of and may allow input to one or more processes. Such windows are primarily associated with graphical displays, which can be manipulated with a mouse cursor such as, for example, the input device 105 depicted in FIG. 1. A GUI using "windows" as one of its main "metaphors" is often referred to as a windowing system.

The user interfaces 272 and 285 with respect to the delivery points 260 and 275 displays the images 410 and 420 captured at the order processing points 210 and the delivery point 260 and 275 in order to match the order number, vehicle identification, and other details with respect to the order 240 placed in the drive-through environment 330. Note that the drive-through environment 330 disclosed herein typically includes a wide range of business applications such as, for example, fast-food restaurants, banks, pharmacies, and coffee shops. The POS system 200 with respect to the drive-through services 330 provide fast and convenient service while increasing the number of customers that may be served through conventional walk-in transactions.

Figure 6:
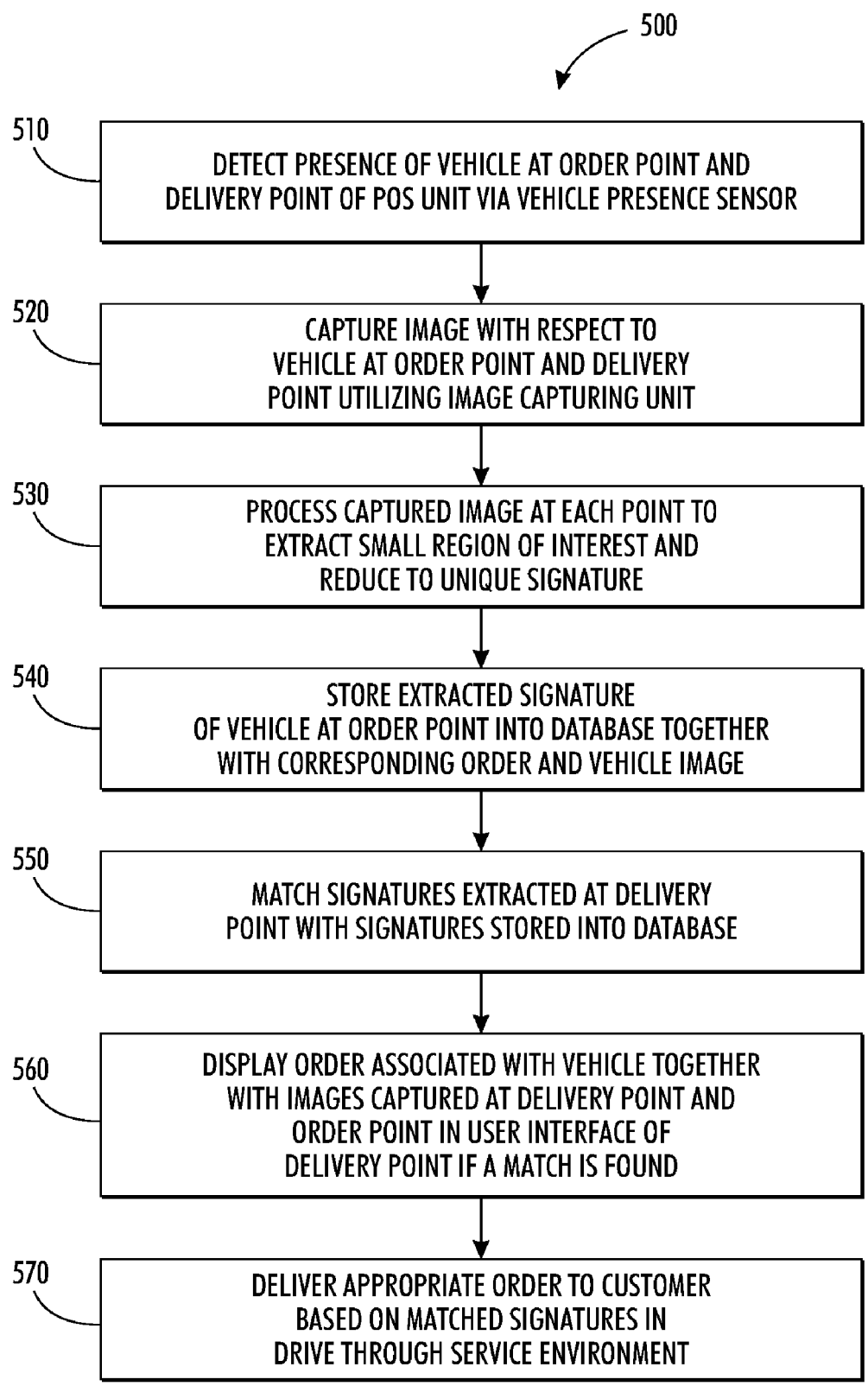
FIG. 6 illustrates a high level flow chart of operations illustrating logical operational steps of method for tracking the order based on a signature with respect to a vehicle, in accordance with the disclosed embodiments.

FIG. 6 illustrates a high level flow chart of operations illustrating logical operational steps of method 500 for tracking order based on the signature 252 with respect to the vehicle 205, in accordance with the disclosed embodiments. Note that the method 500 can be implemented in the context of a computer-useable medium that contains a program product including, for example, a module or group of modules. Again as a reminder, note that in FIGS. 1-6, identical or similar blocks are generally indicated by identical reference numerals. The presence of the vehicle 205 within the drive through environment 330 can be detected via the vehicle presence sensors 230, 270, and 280 associated with the POS system 200, as illustrated at block 510. The image 254 with respect to the vehicle 205 can be captured at each point 210, 260, and 275 utilizing the image capturing units 212, 262, and 272 respectively, as depicted at block 520.

The image 254 captured at the order processing unit 210 can be processed in order to extract the small region of interest 220 via the centralized server 290 and reduced to unique signatures 252, as illustrated at block 530. The extracted signatures 252 of the vehicle 205 at the order processing unit 210 can be stored in the database 250 together with the corresponding order 240 and the vehicle image 254, as depicted at block 540. The signature 252 extracted at the delivery points 260 and 275 can be matched with the signature 252 stored in the database 250, as illustrated at block 550.

If a match is found, the order 240 associated with vehicle 205 together with images 254 captured at the delivery points 260 and 275 and the order processing unit 210, can be further displayed at the user interface 272 and 285 of the delivery points 260 and 275, as depicted at block 560. Finally, the appropriate order 240 with respect to the customer can be delivered based on the matched signatures 252 in the drive through service environment 330, as illustrated at block 570. Such a system and method can be effectively utilized in a wide range of drive through service environments in order to ensure respective orders have been assembled and are ready to be presented or delivered to the customer.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for providing signature-based order tracking, said method comprising:
   capturing an image with respect to a vehicle at an order point and a delivery point with respect to a point of sale unit utilizing an image capturing unit by detecting a presence of said vehicle at said order point and said delivery point utilizing a vehicle presence sensor;

processing said image captured at said order point and said delivery point to extract a small region of interest in order to thereafter reduce said small region of interest to a unique signature wherein said signature associated with said order point is stored into a database together with a corresponding order and said image; and matching said signature associated with said delivery point with said signature stored into said database in order to thereafter display said order associated with said vehicle together with said image captured at said delivery point and said ordering point in a user interface at said delivery point to ensure a right order is delivered to a customer.

2. The method of claim 1 further comprising locating said region of interest in order to thereafter extract said signature of said vehicle at said order point in an extraction mode.

3. The method of claim 1 further comprising extracting said region of interest with respect to said image utilizing an automated license plate recognition technique in order to determine said signature.

4. The method of claim 3 wherein said automated license plate recognition technique comprises a mathematical morphological based recognition technique.

5. The method of claim 1 wherein said region of interest comprises at least one of the following types of images:
   a license plate number;
   a bit map of said region of interest; and
   a Scale-invariant feature transform.

6. The method of claim 1 further comprising extracting a current signature of said vehicle at a payment point and a pick-up point in order to thereafter match said current signature with said signature stored in said database in a matching mode.

7. The method of claim 1 further comprising performing a simple character comparison if said signature comprises said license plate number.

8. The method of claim 1 further comprising performing a 2-D correlation type matching if said signature comprises said bitmap.

9. The method of claim 1 further comprising performing a matching based on Euclidean distance of feature vector if said signature comprises said Scale-invariant feature transform.

10. The method of claim 1 further comprising automatically deleting said signature along with said image and said order from said database after dispatching said order to said customer.

11. A system for providing signature-based order tracking, said system comprising:
    a processor;
    a data bus coupled to said processor; and
    a computer-usable medium embodying computer code, said computer-usable medium being coupled to said data bus, said computer program code comprising instructions executable by said processor and configured for:

capturing an image with respect to a vehicle at an order point and a delivery point with respect to a point of sale unit utilizing an image capturing unit by detecting a presence of said vehicle at said order point and said delivery point utilizing a vehicle presence sensor;

processing said image captured at said order point and said delivery point to extract a small region of interest in order to thereafter reduce said small region of interest to a unique signature wherein said signature associated with said order point is stored into a database together with a corresponding order and said image; and matching said signature associated with said delivery point with said signature stored into said database in order to thereafter display said order associated with said vehicle together with said image captured at said delivery point and said ordering point in a user interface at said delivery point to ensure a right order is delivered to a customer.

12. The system of claim 11 wherein said instructions are further configured for locating said region of interest in order to thereafter extract said signature of said vehicle at said order point in an extraction mode.

13. The system of claim 11 wherein said instructions are further configured for extracting said region of interest with respect to said image utilizing an automated license plate recognition technique in order to determine said signature.

14. The system of claim 13 wherein said automated license plate recognition technique comprises a mathematical morphological based recognition technique.

15. The system of claim 11 wherein said region of interest comprises at least one of the following types of images:
    a license plate number;
    a bit map of said region of interest; and
    a Scale-invariant feature transform.

16. The system of claim 11 wherein said instructions are further configured for extracting a current signature of said vehicle at a payment point and a pick-up point in order to thereafter match said current signature with said signature stored in said database in a matching mode.

17. The system of claim 11 wherein said instructions are further configured for performing a simple character comparison, if said signature comprises said license plate number.

18. The system of claim 11 wherein said instructions are further configured for performing a 2-D correlation type matching, if said signature comprises said bitmap.

19. The system of claim 11 wherein said instructions are further configured for performing a matching based on Euclidean distance of feature vector if said signature comprises said Scale-invariant feature transform.

20. The system of claim 11 wherein said instructions are further configured for automatically deleting said signature along with said image and said order from said database after dispatching said order to said customer.

* * * * *